(12) United States Patent
Yoon et al.

(10) Patent No.: US 12,046,746 B2
(45) Date of Patent: Jul. 23, 2024

(54) LITHIUM METAL NEGATIVE ELECTRODE AND LITHIUM METAL BATTERY INCLUDING THE SAME

(71) Applicants: LG CHEM, LTD., Seoul (KR); KOREA ADVANCED INSTITUTE OF SCIENCE AND TECHNOLOGY, Daejeon (KR)

(72) Inventors: Jong Keon Yoon, Daejeon (KR); Yunjung Kim, Daejeon (KR); Hyunwoong Yun, Daejeon (KR); Sunwoo Hwang, Daejeon (KR); Hoejin Hah, Daejeon (KR); Hee-Tak Kim, Daejeon (KR); Youngil Roh, Daejeon (KR)

(73) Assignees: LG ENERGY SOLUTION, LTD., Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 721 days.

(21) Appl. No.: 17/271,659

(22) PCT Filed: Jul. 15, 2020

(86) PCT No.: PCT/KR2020/009338
§ 371 (c)(1),
(2) Date: Feb. 26, 2021

(87) PCT Pub. No.: WO2021/010753
PCT Pub. Date: Jan. 21, 2021

(65) Prior Publication Data
US 2021/0344006 A1    Nov. 4, 2021

(30) Foreign Application Priority Data
Jul. 16, 2019  (KR) .................. 10-2019-0085902

(51) Int. Cl.
*H01M 4/38* (2006.01)
*H01M 4/04* (2006.01)
(Continued)

(52) U.S. Cl.
CPC ......... *H01M 4/382* (2013.01); *H01M 4/0404* (2013.01); *H01M 4/366* (2013.01);
(Continued)

(58) Field of Classification Search
CPC .... H01M 4/137; H01M 4/382; H01M 50/449; H01M 4/5815
(Continued)

(56) References Cited

U.S. PATENT DOCUMENTS 7,354,680 B2   4/2008 Mikhaylik
7,553,590 B2   6/2009 Mikhaylik
(Continued)

FOREIGN PATENT DOCUMENTS

CN   105702914 A   6/2016
CN   106463678 A   2/2017
(Continued)

OTHER PUBLICATIONS

Endo et al., Copolymerization of Lipoic Acid with 1,2-Dithiane and Characterization of the Copolymer as an Interlocked Cyclic Polymer, May 17, 2006, Macromolecules, vol. 39, p. 4042 (Conclusion) (Year: 2006).*
(Continued)

*Primary Examiner* — Pamela H Weiss
*Assistant Examiner* — John S Medley
(74) *Attorney, Agent, or Firm* — Birch, Stewart, Kolasch & Birch, LLP

(57) ABSTRACT

A lithium metal negative electrode and a lithium metal battery including the lithium metal negative electrode. The lithium metal negative electrode includes a protective layer
(Continued)

present on at least one surface of the negative electrode for stabilizing between the lithium metal and the electrolyte. The protective layer includes a polymer of alpha lipoic acid (ALA) and sulfur molecule ($S_8$), a depolymerized product of the polymer, an inorganic sulfide-based compound, and at least one of an inorganic nitride-based compound, or an inorganic nitrate-based compound.

16 Claims, 16 Drawing Sheets

(51) Int. Cl.
  *H01M 4/36* (2006.01)
  *H01M 4/58* (2010.01)
  *H01M 4/66* (2006.01)
  *H01M 10/0525* (2010.01)
  *H01M 50/449* (2021.01)
  *H01M 4/02* (2006.01)

(52) U.S. Cl.
  CPC ......... *H01M 4/5815* (2013.01); *H01M 4/661* (2013.01); *H01M 10/0525* (2013.01); *H01M 50/449* (2021.01); *H01M 2004/027* (2013.01); *H01M 2300/0028* (2013.01)

(58) Field of Classification Search
  USPC ........................................... 429/231
  See application file for complete search history.

(56) References Cited

U.S. PATENT DOCUMENTS

| | | |
|---|---|---|
| 8,828,610 B2 | 9/2014 | Mikhaylik |
| 9,716,291 B2 | 7/2017 | Mikhaylik |
| 10,297,827 B2 | 5/2019 | Scordilis-Kelley et al. |
| 2007/0082270 A1 | 4/2007 | Mikhaylik |
| 2008/0187840 A1 | 8/2008 | Mikhaylik |
| 2008/0193835 A1 | 8/2008 | Mikhaylik |
| 2010/0035161 A1 | 2/2010 | Yamaguchi et al. |
| 2010/0173936 A1 | 7/2010 | Khan et al. |
| 2011/0287305 A1 | 11/2011 | Scordilis-Kelley et al. |
| 2014/0335399 A1 | 11/2014 | Mikhaylik |
| 2015/0349310 A1 | 12/2015 | Viner et al. |
| 2017/0062829 A1 | 3/2017 | Ryu et al. |
| 2017/0104209 A1 | 4/2017 | Son et al. |
| 2017/0117551 A1 | 4/2017 | Choi et al. |
| 2017/0141404 A1* | 5/2017 | Song ................. H01M 10/0525 |
| 2018/0337406 A1* | 11/2018 | Mudalige .............. H01M 4/622 |
| 2019/0207216 A1 | 7/2019 | Scordilis-Kelley et al. |
| 2019/0372122 A1* | 12/2019 | Song ..................... H01M 4/382 |

FOREIGN PATENT DOCUMENTS

| | | | | |
|---|---|---|---|---|
| CN | 106486699 A | 3/2017 | | |
| EP | 3 149 798 A1 | 4/2017 | | |
| JP | 2007-518229 A | 7/2007 | | |
| JP | 2010-40336 A | 2/2010 | | |
| KR | 10-2011-0103987 A | 9/2011 | | |
| KR | 10-2013-0132681 A | 12/2013 | | |
| KR | 10-2014-0140716 A | 12/2014 | | |
| KR | 10-2015-0062084 A | 6/2015 | | |
| KR | 20150062084 A | * 6/2015 | .......... H01M 10/052 |
| KR | 10-2016-0052323 A | 5/2016 | | |
| KR | 10-2019-0056839 A | 5/2019 | | |
| WO | WO 2015/080357 A1 | 6/2015 | | |

OTHER PUBLICATIONS

Molecular Weight and The Effects on Polymer Properties, Jan. 29, 2018, Amco Polymers, p. 2 (Year: 2018).*
Cheng et al., "Implantable Solid Electrolyte Interphase in Lithium-Metal Batteries", The Chemistry Journal of Science 2, 2017 Feb. 2017, pp. 258-270 (Total No. Pgs. 14).
Cheng et al., "Sulfurized solid electrolyte interphases with a rapid Li+ diffusion on dendrite-free Li metal anodes", Energy Storage Materials, vol. 10, 2018, pp. 199-205.
International Search Report issued in PCT/KR2020/009338 (PCT/ISA/210), dated Nov. 3, 2020.
Lee et al., "A simple composite protective layer coating that enhances the cycling stability of lithium metal batteries", Journal of Power Sources, vol. 284, 2015, pp. 103-108.
Li et al., "The synergetic effect of lithium polysulfide and lithium nitrate to prevent lithium dendrite growth", Nature Communication, 6:7436, 2015, pp. 1-8.
Song et al., "Polysulfide rejection layer from alpha-lipoic acid for high performance lithium-sulfur battery", Journal of Materials Chemistry A, vol. 3, No. 1, 2015, pp. 323-330.
Extended European Search Report for European Application No. 20840546.4, dated Oct. 15, 2021.

* cited by examiner

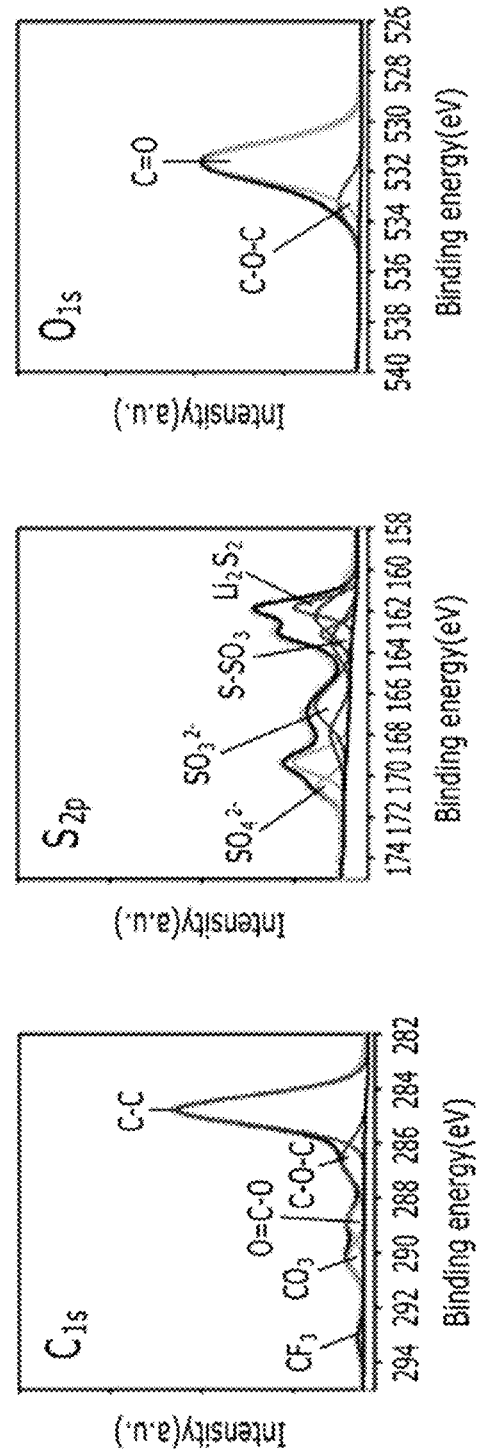

LITHIUM METAL NEGATIVE ELECTRODE AND LITHIUM METAL BATTERY INCLUDING THE SAME

CROSS-CITATION WITH RELATED APPLICATION(S)

This application claims the benefit of Korean Patent Application No. 10-2019-0085902 filed on Jul. 16, 2019 with the Korean Intellectual Property Office, the disclosure of which is incorporated herein by reference in its entirety.

TECHNICAL FIELD

The present disclosure relates to a lithium metal negative electrode, and a lithium metal battery including the same

BACKGROUND ART

Lithium metal battery is a secondary battery using lithium metal (Li-metal) as a negative electrode active material, and can exhibit a high theoretical capacity (3860 mAh/g) and a low standard reduction potential (−3.040 V vs. SHE). Thus, the lithium metal battery is spotlighted as a next-generation battery for replacing lithium-ion batteries that use carbon-based anode active materials such as graphite.

However, due to the high reactivity of the lithium metal, the fact that the coulombic efficiency is low, the lifespan is short, and the safety is low as compared with the lithium ion battery is a factor that delays the commercialization of the lithium metal battery.

Specifically, during driving of the lithium metal battery, dendritic lithium dendrite and dead lithium may be formed on the surface of the lithium metal negative electrode. These materials can form a solid electrolyte interphase (SEI) on the surface of a lithium metal negative electrode, and the process of being easily broken and formed can be repeated.

Accordingly, the negative electrode active material capable of participating in the electrochemical reaction is gradually lost, whereby the coulombic efficiency decreases and the lifetime of the lithium metal battery may be shortened.

Moreover, lithium dendrites grown from the surface of a lithium metal negative electrode penetrate the separator and reach the positive electrode, and may cause an internal short circuit of the lithium metal battery, which is directly related to safety problems such as fire and explosion.

Therefore, in order to implement a lithium metal battery that ensures safety while exhibiting high performance, it is essential to suppress the growth of dendrites on the surface of the lithium metal negative electrode and improve the reversibility of the electrodeposition and desorption reaction of the lithium metal on the surface of the lithium metal negative electrode.

DETAILED DESCRIPTION OF THE INVENTION

Technical Problem

In one embodiment of the present disclosure, a stable protective layer is formed on one surface or both surfaces of the lithium metal negative electrode, so as to suppress the growth of dendrites on the surface.

Further, the electrodeposition and desorption reaction of lithium metal in the lower part of the protective layer is reversibly performed with excellent efficiency, and ultimately, thereby specifying the components of the protective layer and the method of forming the protective layer so that the lifetime of the lithium metal battery can be improved.

Technical Solution

Throughout the specification, when a part is referred to as "including" a certain component, it means that it can further include other components, without excluding the other components, unless otherwise stated. The term "about or approximately" or "substantially" used herein is intended to have meanings close to numerical values or ranges specified with an allowable error and intended to prevent accurate or absolute numerical values disclosed for understanding of the present disclosure from being illegally or unfairly used by any unconscionable third party. Further, throughout the specification, the term "step of" does not mean "step for".

Throughout the specification, the term "combination(s) thereof" included in Markush type description means mixture or combination of one or more selected from a group consisting of components described in Markush type and thereby means including one or more selected from a group consisting of the components.

Based on the above definitions, embodiments of the present disclosure will be described in detail. However, these are presented for illustrative purposes only, and the present disclosure is not limited thereto, and the present disclosure is only defined by the scope of the claims described later.

A lithium metal negative electrode according to one embodiment of the present disclosure includes a negative electrode and a protective layer present on at least one surface of the negative electrode, wherein the protective layer includes all of the following (A) to (D) as components thereof:

(A) a polymer of alpha lipoic acid (ALA) and sulfur molecule ($S_8$);

(B) a depolymerized product of the polymer;

(C) an inorganic sulfide-based compound; and (D) an inorganic nitride-based compound, an inorganic nitrate-based compound, or a mixture thereof.

As used herein, the "protective layer" is defined as a concept that includes not only when the (A) to (D) are directly coated onto the surface of the lithium metal layer, but also when a solid electrolyte interface (SEI) that is present in the space between an electrolyte and a lithium metal layer in the battery containing the lithium metal negative electrode of the one embodiment, and thus stabilizes the interface.

The protective layer of the one embodiment may be formed by an ex-situ method, but may be formed by an in-situ method. In the latter case, a stable interface can be formed while minimizing the resistance of the lithium metal battery.

In another embodiment of the present disclosure, there is provided a method of forming the protective layer of the one embodiment in an in-situ manner in the process of producing a lithium metal battery. Specifically, a protective layer including all of the above (A) to (D) may be formed in a series of manufacturing processes of a lithium metal battery, including the steps of: preparing a polymer of alpha lipoic acid (ALA) and sulfur molecule ($S_8$); coating the polymer onto one surface of the separator; preparing an electrode assembly wherein the separator surface coated with the polymer is positioned opposite to a lithium metal negative electrode, and the other surface of the separator is positioned opposite to a negative electrode, injecting an electrolyte into the separator in the electrode assembly; and packaging the assembly after injecting the electrolyte to obtain a lithium metal battery.

In the case of the negative electrode to be formed of the protective layer, it may be a lithium-free negative electrode (Li free anode) composed of only a copper current collector; and may include a copper current collector; and a lithium metal layer present on the copper current collector. In the former case, when the battery is assembled, a lithium free anode composed of only a copper current collector may be formed, but a lithium metal layer may be formed on the surface of the copper current collector in accordance with battery charge/discharge.

Thus, in the obtained lithium metal battery, a part of the polymer coated onto the surface of the separator may be depolymerized by reacting the polymer with the lithium metal of the negative electrode, another part of the polymer coated onto the surface of the separator and the depolymerized product may be reduced and decomposed by reacting with the lithium metal of the negative electrode, and wherein the electrolyte comprises $LiNO_3$ and the $LiNO_3$ may be reduced and decomposed by reacting with the lithium metal of the negative electrode.

In another embodiment of the present disclosure, there is provided a lithium metal battery including: the above-mentioned lithium metal negative electrode; a positive electrode; a separator present between the lithium metal negative electrode and the positive electrode; and an electrolyte impregnated in the separator.

Hereinafter, the components of the protective layer will be described with reference to FIG. 1, and an in-situ formation method of the protective layer including the components will be described.

(A) Polymer of Alpha Lipoic Acid (ALA) and Sulfur Molecule ($S_8$)

The alpha lipoic acid (ALA) is known to have a melting point of 63° C., and when heated at a temperature higher than that, due to the characteristics of the unstable disulfide bond (S—S) in the molecule and the spatial stress of the pentagonal ring, the ring is opened to form a radical in sulfur at the terminal.

When alpha lipoic acid (ALA) is present alone and is heated above its melting point, the above-mentioned ring opening reaction and radical polymerization reaction occur, so that poly alpha lipoic acid (poly(ALA)) can be synthesized.

Meanwhile, the sulfur molecule $S_8$ is an octagonal ring-shaped molecule, and may be ring-opened at a temperature of about 159° C. or more to form a radical. In this regard, when the mixture of sulfur molecules ($S_8$) and alpha lipoic acid (ALA) is heated above the ring opening temperature of the sulfur molecules ($S_8$), each ring is opened, and radical polymerization can be proceeded.

The resulting polymer of sulfur molecules ($S_8$) and alpha lipoic acid (ALA) (hereinafter, also referred to as poly (ALA-S) in some cases) can be represented by the following Chemical Formula 1:

[Chemical Formula 1]

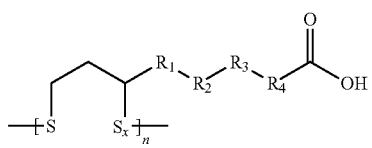

in the Chemical Formula 1, $R_1$ to $R_4$ may be each independently a substituted or unsubstituted C1 to C3 alkylene group, specifically an unsubstituted C1 alkylene group; may be $3 \leq n \leq 10$, specifically $2 \leq n \leq 8$; and may be $1 < x \leq 10$, specifically $2 < x \leq 9$.

The structure of Chemical Formula 1 may be related to the synthesis process of poly(ALA-S). Specifically, the sulfur molecule ($S_8$) may be ring-opened to form a radical, and then bonded to the ring-opened terminal (i.e., sulfur chain) of the alpha lipoic acid (ALA).

Meanwhile, in the synthesis of poly(ALA-S), the weight ratio of alpha lipoic acid (ALA) and sulfur molecule ($S_8$) is not particularly limited, but may be in the range of 8:2 to 3:7, specifically 5:5 to 3:7. The higher the content of sulfur molecules ($S_8$) within this range, the lower the ionic conductivity of the lithium metal battery, while the reduction decomposition proceeds smoothly as will be described later to exhibit the effect of forming an inorganic sulfide-based compound.

According to the ionic conductivity experiment (Experimental Example 2) described later, the ionic conductivity tends to decrease as the sulfur content increases, but even in the case of 3:7, which is the highest sulfur content, it exhibits a level of $10^{-5}$ S/cm where ionic conduction is sufficiently possible. In contrast, the poly(ALA) does not readily undergo reductive decomposition on the metal surface. As the sulfur content increases, the reductive decomposition of poly(ALA-S) proceeds smoothly, so that more inorganic sulfide-based SEI ($Li_2S$ and $Li_2S_2$) is produced on the metal surface, and as the sulfur content is higher during actual battery operation, the overvoltage may be rather lower during actual cell operation.

(B) Depolymerized Product of the Polymer

As described above, the protective layer of the one embodiment can be formed by an in-situ method. To this end, a lithium metal battery can be manufactured in a series of steps of coating the poly(ALA-S) onto one surface of the protective film, and then forming an assembly of a negative electrode-separator-positive electrode structure so as to be opposed to the lithium metal of the negative electrode including the negative electrode current collector and the lithium metal layer located on the surface, and injecting an electrolyte.

In the lithium metal battery manufactured thereby, the lithium metal layer of the negative electrode and the polymer coated on one surface of the separator may come into contact with each other.

When the (A) poly(ALA-S) comes into contact with the lithium metal layer, it may be depolymerized to form the (B) oligomer, monomer, or a mixture thereof. Since the potential of this reaction is higher than the potential at which the reductive decomposition of electrolyte occurs, it takes precedence over electrolyte decomposition due to the reaction between the electrolyte and lithium metal.

First, the poly(ALA-S) may be depolymerized by reacting with the lithium metal on the surface of the lithium metal to form an oligomer represented by the following Chemical Formula 1-1:

[Chemical Formula 1-1]

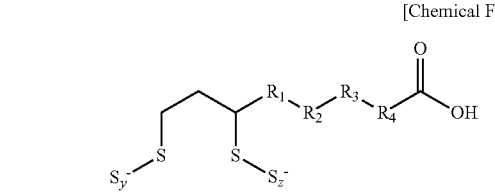

in the Chemical Formula 1-1, the $R_1$ to $R_4$ may be each independently a substituted or unsubstituted C1 to C3 alkylene group, specifically an unsubstituted C1 alkylene group; may be 1≤y≤6, specifically 1≤y≤5; and may be 1≤z≤6, specifically 1≤z≤5.

The oligomer represented by Chemical Formula 1-1 is a type of thiolate, and may form a protective layer on the surface of the lithium metal negative electrode together with lithium cations (Lit) dissociated from the additive. Hereinafter, in some cases, the compound of oligomer and lithium cation represented by Chemical Formula 1-1 are also referred to as Li-poly(ALA-S) thiolate.

The oligomer represented by Chemical Formula 1-1 is reduced by a low reduction potential of lithium, and a reaction in which the terminal sulfur chain is further broken may proceed to form a monomer represented by Chemical Formula 1-2:

[Chemical Formula 1-2]

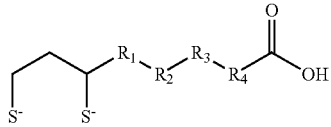

in the Chemical Formula 1-2, $R_1$ to $R_4$ may be each independently a substituted or unsubstituted C1 to C3 alkylene group, specifically an unsubstituted C1 alkylene group.

The monomer represented by Chemical Formula 1-2 is also a type of thiolate, and can form a protective layer on the surface of the lithium metal negative electrode together with the lithium cation (Li$^+$) dissociated from the additive. Hereinafter, in some cases, the compound of the monomer and lithium cation represented by Chemical Formula 1-2 is also referred to as Li-ALA thiolate.

Considering the formation process of the oligomer represented by Chemical Formula 1-1 and the monomer represented by Chemical Formula 1-2, it can be seen that the composition in the final protective layer may vary depending on whether the poly(ALA-S) in the protective layer is partially or completely depolymerized.

Specifically, the protective layer of the one embodiment may include the poly(ALA-S) alone, but further include an oligomer, a monomer or a mixture thereof by depolymerization of the poly (ALA-S), together with the poly(ALA-S). Alternatively, it is possible to include an oligomer, a monomer, or a mixture thereof obtained by depolymerization of the poly(ALA-S), without including the poly(ALA-S).

(C) Inorganic Sulfide Compound

On the other hand, when the driving voltage of the lithium metal battery drops below 0V, since the voltage is lower than the equilibrium potential of the oxidation-reduction reaction of sulfur or the sulfur functional group, it can be electrochemically reduced and decomposed to produce the (C) inorganic sulfide-based compound.

The poly(ALA-S) is easily decomposed chemically or electrochemically in a state of being in contact with the lithium metal layer. The (A) poly(ALA-S) forms a uniform interface with lithium metal which also has a high surface energy, due to the high surface energy of the lithium metal layer. At the interface thus generated, a chemical decomposition reaction occurs due to a difference in potential between poly(ALA-S) containing a large amount of sulfur functional groups (2.1 to 2.3V vs SHE) having a high reduction potential and lithium metal having a low reduction potential (−3.04V vs SHE).

As a result of the decomposition, an inorganic sulfide-based compound including $Li_2S$, $Li_2S_2$, or a mixture thereof may be formed. Such a decomposition reaction can easily occur compared to poly(ALA), due to the structure of poly(ALA-S) represented by Chemical Formula 1.

In this regard, among the components of the protective layer of the one embodiment, the (C) inorganic sulfide-based compound may be a product in which the (A) poly (ALA-S) is chemically or electrochemically decomposed in contact with the lithium metal layer. The (C) inorganic sulfide-based compound may contribute to stabilizing an interface with an electrolyte in a lithium metal battery.

(D) Inorganic Nitride-Based Compound, Inorganic Nitrate-Based Compound, or Mixture Thereof The (C) inorganic sulfide-based compound is stable because it can withstand a rapid volume expansion of the lithium metal layer and/or the lithium metal battery, but has a disadvantage that the ionic conductivity is lowered.

In this regard, in the one embodiment, $LiNO_3$ is added to the electrolyte so that the $LiNO_3$ reacts with the lithium metal layer of the negative electrode to be reduced and decomposed, and an inorganic nitride-based compound, an inorganic nitrate-based compound, or a mixture thereof, which is the reductive decomposition product (D), is also made to be the component of the protective layer.

Specifically, a single material of the inorganic nitride-based compound or the inorganic nitrate-based compound may be produced as a reduction and decomposition product by the reaction of the lithium metal layer of the negative electrode and the $LiNO_3$, but a mixture of the two materials may be produced.

Here, the inorganic nitride-based compound may include $Li_3N$, and the inorganic nitrate-based compound may include $LiN_xO_y$ (where x:y=1:2 to 1:3). These have higher ionic conductivity than the (C) inorganic sulfide-based compound, and thus may contribute to resistance reduction of the negative electrode of the one embodiment and improvement of the ionic conductivity.

Method for Manufacturing a Lithium Metal Battery (In-Situ Formation Method of the Protective Layer)

The protective layer including all of the above (A) to (D) may be formed by an in-situ method during the manufacturing process of a lithium metal battery, as previously mentioned.

As previously mentioned, the protective layer including all of the above (A) to (D) may be formed in a series of manufacturing processes of a lithium metal battery, including the steps of: preparing a polymer of alpha lipoic acid (ALA) and sulfur molecule ($S_8$); coating the polymer onto one surface of the separator; preparing an electrode assembly so as to be opposed to one surface of a separator coated with the polymer to a lithium metal negative electrode, and be opposed to the other surface of the separator to a positive electrode, thereby preparing an electrode assembly, injecting an electrolyte into the separator in the assembly; and packaging the assembly into which the electrolyte is injected, thereby obtaining a lithium metal battery.

More specifically, in the lithium metal battery obtained according to the method of the one embodiment, a part of the polymer coated on the surface of the separator may be depolymerized by reacting with the lithium metal of the negative electrode to form the (B); another part of the polymer coated on the surface of the separator may be reduced and decomposed by reacting with the electrolyte to form the (C); $LiNO_3$ added to the electrolyte may be decomposed and reduced by reacting with the lithium metal of the negative electrode to form (D).

The step of preparing the polymer may be a step of heat-treating a mixture of alpha lipoic acid (ALA) and sulfur molecule ($S_8$) as described above to form a radical by ring opening and proceeding a radical polymerization reaction.

In this regard, the heat treatment temperature may be a higher ring opening temperature among the alpha lipoic acid (ALA) and sulfur molecules ($S_8$), that is, 159° C. or more, which is the ring opening temperature of the sulfur molecules ($S_8$), and the temperature is not particularly limited.

Experimentally, the heat treatment temperature can be controlled from 150° C. or more to 180° C. or less, specifically from 159° C. or more to 175° C. or less, during the step of preparing the polymer, and in this range, the process efficiency may be excellent, and the thermal damage of the synthesized polymer may be small.

In the step of coating the polymer onto one surface of the separator, the coating method is not particularly limited, and an appropriate method may be selected from methods well known in the art, such as spray coating and dip coating.

Since the protective layer is formed after being coated onto the separator, the thickness of the (A) poly(ALA-S) coating onto the separator can be discussed. Although not particularly limited, the thickness of the (A) poly(ALA-S) coating onto the separator to form the protective layer may be 1 μm to 10 μm, specifically 1 μm to 3 μm, and in this range, it exhibits the effect of stabilizing the interface between the lithium metal layer and the electrolyte.

In addition, between the lithium metal negative electrode and the protective layer, a polymer (poly(ALA-S)) in the protective layer can be depolymerized to form the oligomer represented by Chemical Formula 1-1, the monomer represented by Chemical Formula 1-2, or mixtures thereof. These can also be the components of the protective layer as described above.

The electrolyte for accelerating the depolymerization may include a lithium salt, an organic solvent, and $LiNO_3$ as an additive. The functions and effects of the additive $LiNO_3$ are as described above.

The concentration of the additive in the electrolyte may be 0.1 to 1.0 M, specifically 0.2 to 0.7 M, for example 0.5 to 0.7 M. As the concentration increases in this range, the lifetime of the lithium metal battery can be increased by a synergistic effect of the (C) inorganic sulfide-based compound, the (D) inorganic nitride-based compound, the inorganic nitrate-based compound, or a mixture thereof.

The lithium salt is not particularly limited, but may include lithium bis(trifluoromethanesulfonyl)imide (LiTFSI). This has a high solubility in an ether-based solvent compared to other lithium salts such as $LiPF_6$, and has an effect of forming LiF, which is known to have an effect of stabilizing the surface of lithium metal during reduction decomposition.

The concentration of the lithium salt is also not limited, but may be controlled within the range of 0.1 to 5.0M. In this range, the electrolyte may have an appropriate conductivity and viscosity, and lithium ions may effectively move within the lithium metal battery of the one embodiment. However, this is only an example, and the present disclosure is not limited thereby.

The organic solvent may be a mixture of 1,3-dioxolane (DOL) and dimethoxy ethane (DME) in a ratio of 3:7 to 7:3, specifically 5:5 to 7:3 by volume. This is more effective than other solvents such as carbonate-based solvents.

Meanwhile, even in the lithium metal battery finally obtained according to the one embodiment, at least one surface of the separator opposing to the negative electrode may contain a coating layer including the polymer, which may mean that the polymer coated onto the surface of the separator before assembling the battery is not completely dissolved in the electrolyte after assembling the battery, and it is coated on the separator again after being dissolved.

In the one embodiment, the separator is not particularly limited, and may be in the form of a porous film. Specifically, the separator includes any one selected from the group consisting of polyolefin, polyester, polysulfone, polyimide, polyetherimide, polyamide, polytetrafluoroethylene, rayon, glass fiber, and mixtures thereof, or it may be a multilayer film thereof. More specifically, the porous separator may be a porous polymer film made of a polyolefin-based polymer such as an ethylene homopolymer, a propylene homopolymer, an ethylene/butene copolymer, an ethylene/hexene copolymer and an ethylene/methacrylic acid copolymer, or a laminated structure having two or more layers thereof.

Further, the separator may have a porosity of 20 to 80% by volume with respect to the total volume of the separator, in a state in which a fluoro-ionomer is not filled. If the porosity of the separator is less than 20% by volume, there may be a problem that the pores decrease rapidly, Li ion transfer becomes difficult, and thus the resistance of the separator increases. If the porosity of the separator exceeds 80% by volume, the mechanical strength of the separator is reduced, which may cause a problem of tearing during cell assembling.

Further, the separator may include a first pore having a D50 of 1 nm to 200 nm in the separator. If the D50 of the first pore is less than 1 nm, the coating layer is not easily formed, or the improvement effect due to the formation of the coating layer is insignificant, and if the D50 of the first pore exceeds 200 nm, there is a risk that the mechanical strength of the separator itself is reduced.

Meanwhile, the separator may be a so-called safety reinforced separator (SRS) whose surface is coated with inorganic particles to enhance thermal stability, mechanical stability, and the like.

The inorganic particles may be coated via a binder, and here, as the inorganic particles and the binder, those commonly known in the art can be used.

In the Experimental Examples described later, both of the two electrodes were made of lithium metal. However, this is due to experimental convenience, and the lithium metal battery of the one embodiment may generally use a positive electrode including a positive electrode current collector and a positive electrode mixture layer present on the positive electrode current collector, as is known in the art.

The positive electrode is manufactured by mixing an active material and a binder, optionally a conductive material, a filler, and the like in a solvent to produce an electrode mixture slurry, and then coating this electrode mixture slurry onto each positive electrode current collector. Since the above-mentioned electrode-manufacturing method is widely known in the art, a detailed description thereof will be omitted herein.

In the case of the positive electrode active material, there is no particular limitation as long as it is a material capable of reversibly intercalating and de-intercalating lithium ions. For example, it may include one or more of complex oxides of cobalt, manganese, nickel, or a combination of metals; and lithium.

In a more specific example, a compound represented by any of the following chemical formulas can be used as the positive electrode active material. $Li_aA_{1-b}R_bD_2$ (wherein, $0.90 \leq a \leq 1.8$ and $0 \leq b \leq 0.5$); $Li_aE_{1-b}R_bO_{2-c}D_c$ (wherein, $0.90 \leq a \leq 1.8$, $0 \leq b \leq 0.5$, and $0 \leq c \leq 0.05$); $LiE_{2-b}R_bO_{4-c}D_c$ (wherein, $0 \leq b \leq 0.5$, and $0 \leq c \leq 0.05$); $Li_aNi_{1-b-c}Co_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, $0.90 \leq a \leq 1.8$, $0 \leq b \leq 0.5$, $0 \leq c \leq 0.05$ and $0 < \alpha \leq 2$); $Li_aNi_{1-b-c}Mn_bR_cO_{2-\alpha}Z_\alpha$ (wherein, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, $0.90 \leq a \leq 1.8$, $0 \leq b \leq 0.9$, $0 \leq c \leq 0.5$ and $0.001 \leq d \leq 0.1$); $Li_aNi_bCo_cMn_dG_eO_2$ (wherein, $0.90 \leq a \leq 1.8$, $0 \leq b \leq 0.9$, $0 \leq c \leq 0.5$, $0 \leq d \leq 0.5$ and $0 \leq e \leq 0.1$); $Li_aNiG_bO_2$ (wherein, $0.90 \leq a \leq 1.8$ and $0.001 \leq b \leq 0.1$); $Li_aCoG_bO_2$ (wherein, $0.90 \leq a \leq 1.8$ and $0.001 \leq b \leq 0.1$); $Li_aMnG_bO_2$ (wherein, $0.90 \leq a \leq 1.8$ and $0.001 \leq b \leq 0.1$); $Li_aMn_2G_bO_4$ (wherein, $0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that may be widely understood by those worked in the art, and thus, detailed descriptions thereof will be omitted.

The positive electrode current collector is typically fabricated to a thickness of 3 to 500 µm. The positive electrode current collector is not particularly limited as long as a corresponding battery has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is not particularly limited as long as a corresponding battery has high conductivity without causing a chemical change in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; carbon fluoride powder; metal powders such as aluminum powder, and nickel powder; conductive whiskers such as zinc oxide and potassium titanate; conductive metal oxides such as titanium oxide; conductive materials such as polyphenylene derivatives may be used.

The lithium metal battery of the one embodiment may not only be used in a unit cell used as a power source for a small device, but also it can be used as a unit cell in a medium or large-sized battery module including a plurality of battery cells. Furthermore, a battery pack including the battery module may be configured.

Advantageous Effects

The lithium metal negative electrode of the one embodiment can suppress the growth of dendrites by a stable protective layer on one surface or both surfaces thereof, can reversibly perform the electrodeposition and desorption reaction of lithium metal in the lower part of the protective layer with excellent efficiency, and can ultimately contribute to the improvement of the life of the lithium metal battery.

The protective layer can be formed by an in-situ method, whereby a stable interface can be formed while further minimizing the resistance of the lithium metal battery.

BRIEF DESCRIPTION OF THE DRAWINGS

FIGS. 4e and 4f show the results of recovering a lithium metal negative electrode from each of the lithium symmetric cells evaluated in FIG. 4c to analyze by X-ray photoelectron analysis method.

DETAILED DESCRIPTION OF THE EMBODIMENTS

Figure 1:
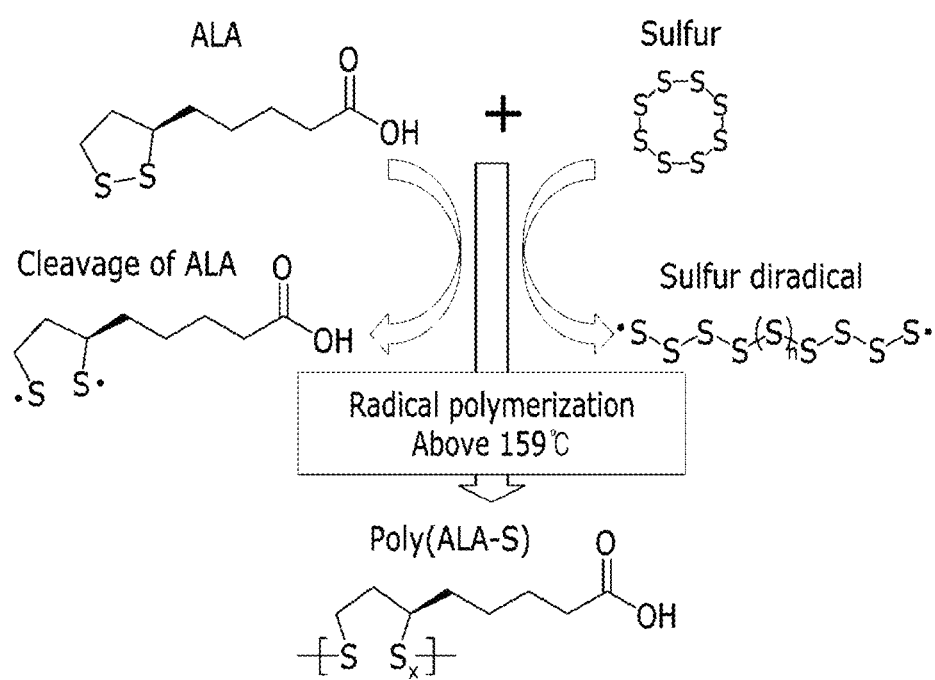
FIG. 1 is a diagram schematically illustrating an in-situ formation method of a protective layer including components of a protective layer according to an embodiment of the present disclosure.

Hereinafter, preferred examples of the present disclosure, comparative examples, and test examples for evaluating them are described. However, the following examples are only preferred examples of the present disclosure, and the present disclosure is not limited to the following examples.

Examples 1 to 3

(1) Preparation of Poly(ALA-S)

Each mixture in which the weight ratio of alpha lipoic acid (ALA) powder and sulfur molecule ($S_8$) powder was 8:2 (Example 1), 5:5 (Example 2), and 3:7 (Example 3) was prepared, and then heat-treated for 3 hours in a reactor having an inert gas atmosphere in which the internal temperature was controlled to 160° C.

The polymer thus obtained will be collectively referred to as poly(ALA-S). Further, according to the mixing ratio of the raw materials, it is represented by poly(ALA:$S_8$) x:y, where x:y corresponds to the weight ratio of ALA and $S_8$ in the manufacturing raw materials. Specifically, poly(ALA:$S_8$) 8:2 is the polymer of Example 1, poly(ALA:$S_8$) 5:5 is the polymer of Example 2, and poly(ALA:$S_8$) 3:7 is the polymer of Example 3.

(2) Preparation of a Separator Whose One Surface is Coated with Poly(ALA-S)

Three separators made of polypropylene (pp) material (width: 4.5 cm* length: 4.5 cm* thickness: 25 μm, porosity: 41% by volume) were prepared.

Each of poly(ALA-S) (Examples 1 to 3) was dissolved in a THF (tetrahydrofuran) solvent to prepare a coating solution, but the solid content in 100 wt % of each coating solution was made to be 1 wt %.

Each coating solution was sprayed on one surface of each of the separators using a manual spray device (Iwata HP-C PLUS) under the condition of 70° C. Then, it was dried under the condition of 60° C.

Accordingly, the separator coated onto one surface was indicated as poly(ALA:S8)_x:y_ppx2, and among the latter indications, "poly(ALA:$S_8$)_x:y" corresponds to the indication method of the polymer used in the coating.

(3) Manufacture of a Battery Including a Separator Whose One Surface is Coated with Poly(ALA-S)

Three types of batteries including the separators of Examples 1 to 3 were prepared. In the Experimental Examples described later, a battery having an appropriate shape was selected according to the experimental method.

(3-1) Manufacture of SUS Symmetric Cell

Each separator of Examples 1 to 3 was cut into a circular shape (cross-sectional area: 2.54 cm$^2$), and then placed between two sheets of stainless steel (SUS) to produce a coin cell, and the electrolyte having the composition of 1M LiTFSI DOL/DME (1:1 v/v) was injected into each coin cell.

(3-2) Manufacture of Lithium Symmetric Cell

The poly(ALA:S8)_3:7_ppx2 (Example 3) was cut into a circular shape (cross-sectional area: 2.54 cm$^2$), and then placed between two sheets of lithium metal (Li-metal) electrodes to make a lithium symmetric cell-shaped coin, and the electrolyte was injected.

Here, in order to confirm the relationship between the electrolyte additive and the coated separator, LiNO$_3$ was added to the composition of 1M LiTFSI in DOL:DME=1:1 (v:v), and each lithium symmetric cell was manufactured using electrolytes in three cases where the concentrations of the additive were 0.2 M, 0.5 M, and 0.7 M, respectively.

(3-3) Manufacture of Li/SUS Cell

The poly(ALA:$S_8$)_3:7_ppx2 (Example 3) was cut into a circular shape (cross-sectional area: 2.54 cm$^2$), and then placed between one lithium metal (Li-metal) electrode and one stainless steel (SUS) to make a lithium half-coin-shaped coin, and the electrolyte was injected. Here, as the electrolyte, LiNO$_3$ was added to the composition of 1M LiTFSI in DOL:DME=1:1 (v:v), and the concentration of the additive was 0.7 M.

Comparative Example 1

(1) Preparation of Poly(ALA)

Alpha lipoic acid (ALA) powder, one of the raw materials for preparing the polymer of Examples 1 to 3, was used alone, and heat-treated for 3 hours in a reactor having an inert gas atmosphere in which the internal temperature was controlled to 160° C.

The polymer thus obtained will be referred to as poly (ALA).

(2) Preparation of a Separator Whose One Surface is Coated with Poly(ALA)

Instead of the polymers of Examples 1 to 3, poly(ALA) of Comparative Example 1 was used to prepare a separator coated onto one surface. The separator coated onto one surface was indicated as poly(ALA)_ppx2.

(3) Manufacture of a Battery Including a Separator Whose One Surface is Coated with Poly(ALA)

A battery including the separator of Comparative Example 1 instead of the separator of Examples 1 to 3 was manufactured.

Comparative Example 2

In Comparative Example 2, no polymer was prepared.

Instead, one separator of polypropylene (pp) material used in Examples 1 to 3 (width: 4.5 cm* length: 4.5 cm* thickness: 25 μm, porosity: 41% by volume) was prepared, and this separator was indicated by Bare_ppx2.

A battery including the separator of Comparative Example 2 was manufactured in the same manner as in Examples 1 to 3.

Comparative Example 3

Also in Comparative Example 3, no polymer was prepared.

Instead, one separator of polypropylene (pp) material used in Examples 1 to 3 (width: 4.5 cm* length: 4.5 cm* thickness: 25 μm, porosity: 41% by volume) was prepared, and this separator was indicated by Bare_ppx2.

On the other hand, Li$_2$S$_8$ is also a type of electrolyte additive, and it is known that a sulfide-based film is formed on the surface of a lithium metal negative electrode in a battery. In this regard, 0.2 M Li$_2$S$_8$ was added to the composition of 1M LiTFSI in DOL:DME=1:1 (v:v), which was used as an electrolyte, and Bare ppx2 was used to produce a lithium symmetric cell.

Comparative Example 4

In Comparative Example 4, a Li/SUS cell was manufactured using the separator of Example 3 (poly(ALA:$S_8$)_3:7_ppx2), but instead of the electrolyte of Example 3, LiNO$_3$ as an additive was not added, and the electrolyte with a composition of 1M LiTFSI in DOL:DME=1:1 (v:v) was used.

Experimental Example 1: Evaluation of Chemical Formula and Structure of the Polymer (Poly (ALA-S)) of Examples 1 to 3

1) Elemental Analysis

The polymers of Examples 1 to 3 (poly(ALA-S)) and the polymer of Comparative Example 1 (poly(ALA)) were each analyzed by an elemental analyzer (EA), and the results are shown in Table 1 below.

TABLE 1

| | Raw material mixture ALA:$S_8$ weight ratio | Elemental analysis result of final material (wt %) | | | | Chemical formula of the final material |
|---|---|---|---|---|---|---|
| | | C | H | O | S | |
| Comparative Example 1 | 10:0 | 46.78 | 6.76 | 16.35 | 30.10 | $C_8H_{13.88}O_{2.10}S_{1.93}$ |
| Example 1 | 8:2 | 35.50 | 4.85 | 11.03 | 48.62 | $C_8H_{13.10}O_{1.86}S_{4.11}$ |
| Example 2 | 5:5 | 31.19 | 4.28 | 8.40 | 56.13 | $C_8H_{13.18}O_{1.62}S_{5.40}$ |
| Example 3 | 3:7 | 23.83 | 3.19 | 6.89 | 66.09 | $C_8H_{12.84}O_{1.73}S_{8.32}$ |

According to Table 1, the chemical formulas of the polymers of Examples 1 to 3 (poly (ALA-S)) and the polymer of Comparative Example 1 (poly (ALA)) can be determined. It was confirmed that poly(ALA) obtained by heat-treating only ALA (Comparative Example 1) has the chemical formula of $C_8H_{13.88}O_{2.10}S_{1.93}$, and the sulfur mole fraction thereof corresponds to a value close to the theoretical value of 2.

On the other hand, in poly(ALA-S) obtained by heat-treating a mixture of ALA and $S_8$ (Examples 1 to 3), the chemical formulas of $C_8H_{13.10}O_{1.86}S_{4.11}$ (Example 1), $C_8H_{13.18}O_{1.62}S_{5.40}$ (Example 2), and $C_8H_{12.54}O_{1.73}S_{8.32}$ (Example 3) were confirmed. It was confirmed that the sulfur mole fraction thereof is proportional to the content of $S_8$ in the raw material mixture.

2) X-Ray Diffraction Analysis

Figure 2:
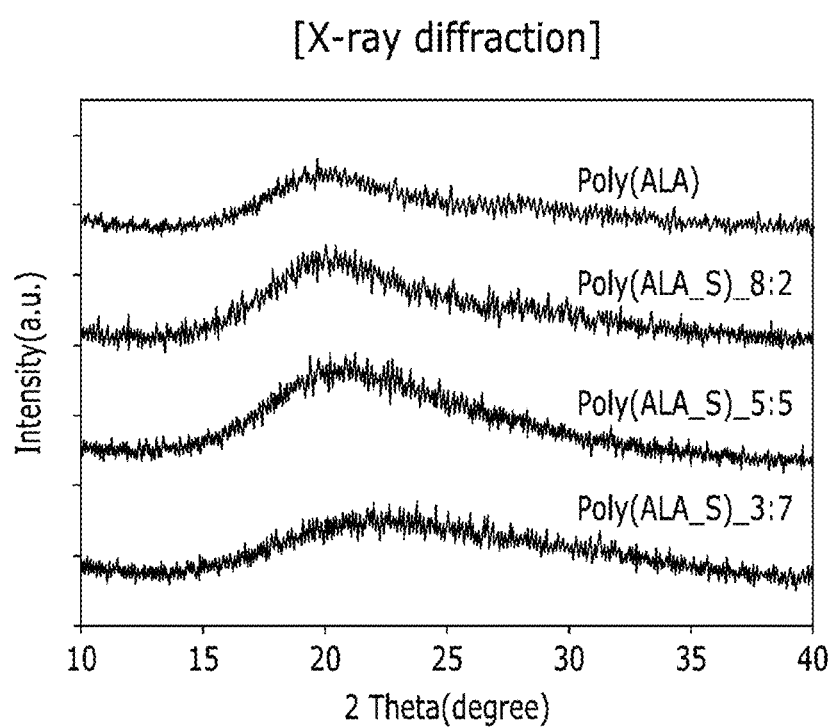
FIG. 2 shows the results of XRD analysis by changing the polymer in Experimental Example 1 described later.

In addition, the polymers of Examples 1 to 3 (poly(ALA-S)) and the polymer of Comparative Example 1 (poly (ALA)) were analyzed with a diffraction analyzer using Cu Kα X-ray (X-Ray Diffraction, XRD, RIGAKU), and the results are shown in FIG. 2.

According to FIG. 2, it can be seen that all polymers are amorphous, and the sulfur element (S) is present in the bulk. From this, in Experimental Example 1, it can be inferred that polymerization was carried out by a method in which $S_8$ was bonded to the ring-opened terminal (i.e., sulfur chain) of ALA, regardless of the weight ratio of ALA and $S_8$.

Experimental Example 2: Surface Observation and Ionic Conductivity Evaluation of the Separator (Poly(ALA:$S_8$)_x:y_ppx2) of Examples 1 to 3

1) Surface Observation

Figure 3A:
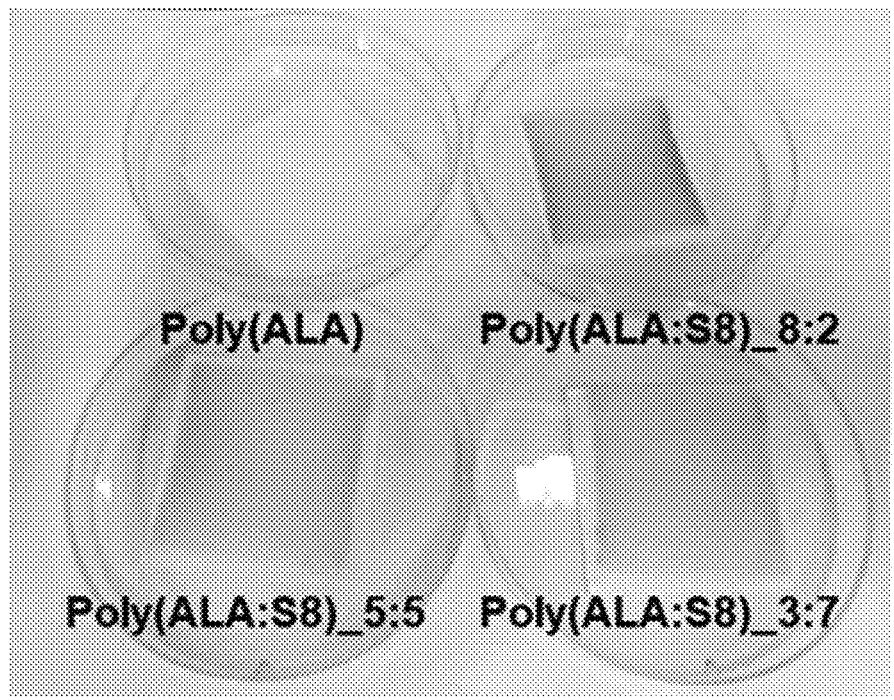
FIGS. 3a and 3b show the results of photographing the coated surface with a digital camera (FIG. 3a) and SEM (FIG. 3b) by changing the polymer, which is the separator coating material, in Experimental Example 2 described later.
Figure 3B:
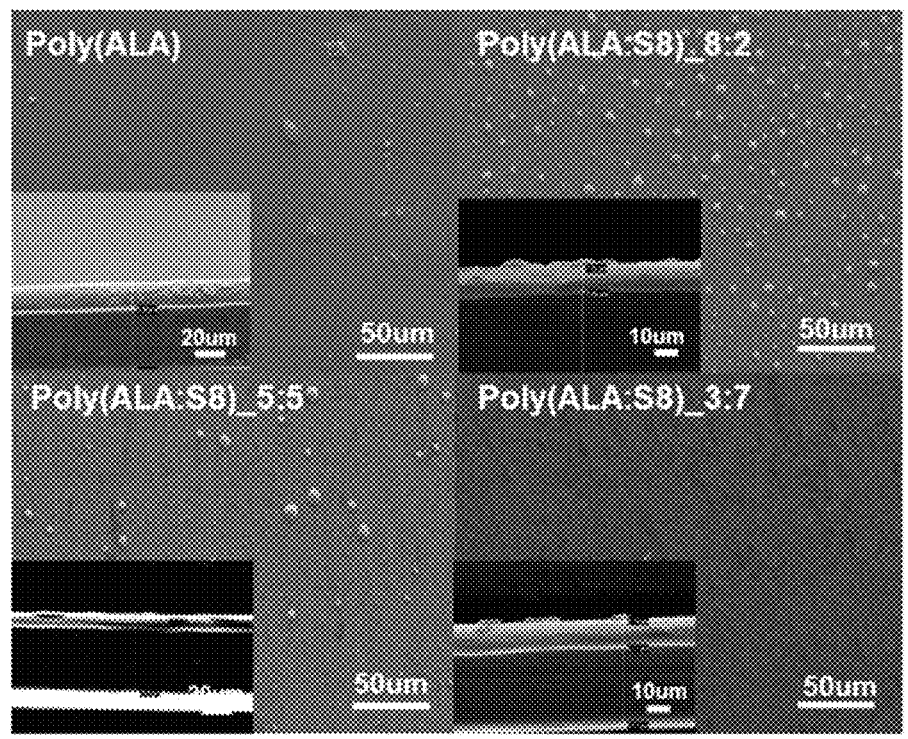

The separators (poly(ALA:$S_8$)_x:y_ppx2) of Examples 1 to 3 and the separator (poly(ALA)_ppx2) of Comparative Example 1 were respectively photographed with a digital camera (Galaxy S9), and shown in FIG. 3a, and also photographed with a scanning electron microscope (SEM) and shown in FIG. 3b.

In FIGS. 3a and 3b, it can be seen that both poly(ALA) (Comparative Example 1) and poly(ALA-S) (Examples 1 to 3) can be uniformly coated onto one surface of the separator.

2) Ionic Conductivity Analysis

The ionic conductivity of the separators of Examples 1 to 3 (poly(ALA:$S_8$)_x:y_ppx2) and the separator of Comparative Example 1 (poly(ALA)_ppx2), ionic conductivity was analyzed using a SUS symmetric cell.

Specifically, for the SUS symmetric cell manufactured including each separator, electrochemical impedance spectroscopy was carried out using an analysis device (VMP3, Bio logic science instrument) under the conditions of amplitude 10 mV and scan range 10 Khz to 100 KHz at 25° C. Based on the impedance analysis result, the ionic conductivity of each coated separator was calculated and shown in Table 2 and FIG. 3c below.

For comparison, the uncoated separator (Bare_ppx2) of Comparative Example 2 was also subjected to impedance analysis in the same manner to calculate the ionic conductivity, and shown in Table 2 and FIG. 3c below.

TABLE 2

| | Ionic conductivity (S/cm) |
|---|---|
| Example 1 poly(ALA:$S_8$)_8:2_ppx2) | $7.60 \times 10^{-4}$ |
| Example 2 poly(ALA:$S_8$)_5:5_ppx2) | $4.13 \times 10^{-4}$ |
| Example 3 poly(ALA:$S_8$)_3:7_ppx2) | $3.53 \times 10^{-4}$ |
| Comparative Example 1 (poly(ALA)_ppx2) | $1.60 \times 10^{-4}$ |
| Comparative Example 2 (Bare ppx2) | $9.28 \times 10^{-4}$ |

Figure 3C:
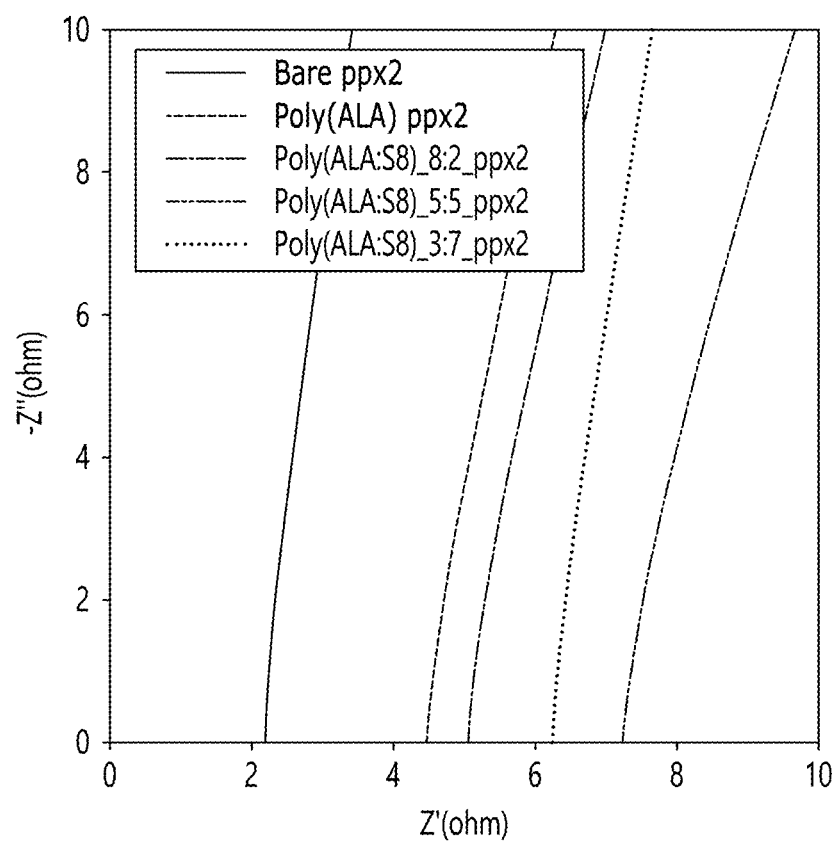
FIG. 3c shows the ionic conductivity of each coated separator.

According to Tables 2 and FIG. 3c, it is confirmed that as the sulfur content in the polymer used for coating the separator increases, the ionic conductivity of the coated separator tends to decrease.

In the separators of Examples 1 to 3 (poly(ALA:$S_8$)_x:y_ppx2), depolymerization of each polymer is performed by a chemical reaction or an electrochemical reaction at the time of being contact with the lithium metal of the negative electrode in the battery, which has been described above.

However, in the case of the SUS symmetric cell used in the ionic conductivity analysis of Experimental Example 2, lithium metal does not exist on the surface of the negative electrode and thus, depolymerization may not occur. Therefore, the ionic conductivity analyzed in Experimental Example 2 may be intrinsic to each polymer, and as the content of ALA in the polymer increases, swelling due to the electrolyte increases, and it can exhibit the tendency of ionic conductivity in Table 2.

Experimental Example 3: Manufacture and Evaluation of a Lithium Symmetrical Cell Including the Coated Separator of Experimental Example 2

1) Here, in order to confirm the relationship between the electrolyte additive and the coated separator, a battery made of a lithium symmetric cell including the separator of Example 3 (poly(ALA:$S_8$)_3:7_ppx2) was used, but lithium symmetric cell samples having different electrolyte compositions were used.

Specifically, $LiNO_3$ was added to the composition of 1M LiTFSI in DOL:DME=1:1 (v:v) $LiNO_3$, but each lithium symmetric cell was manufactured using electrolytes in three cases where the concentrations of the additive were 0.2 M, 0.5 M, and 0.7 M, respectively.

Figure 4A:
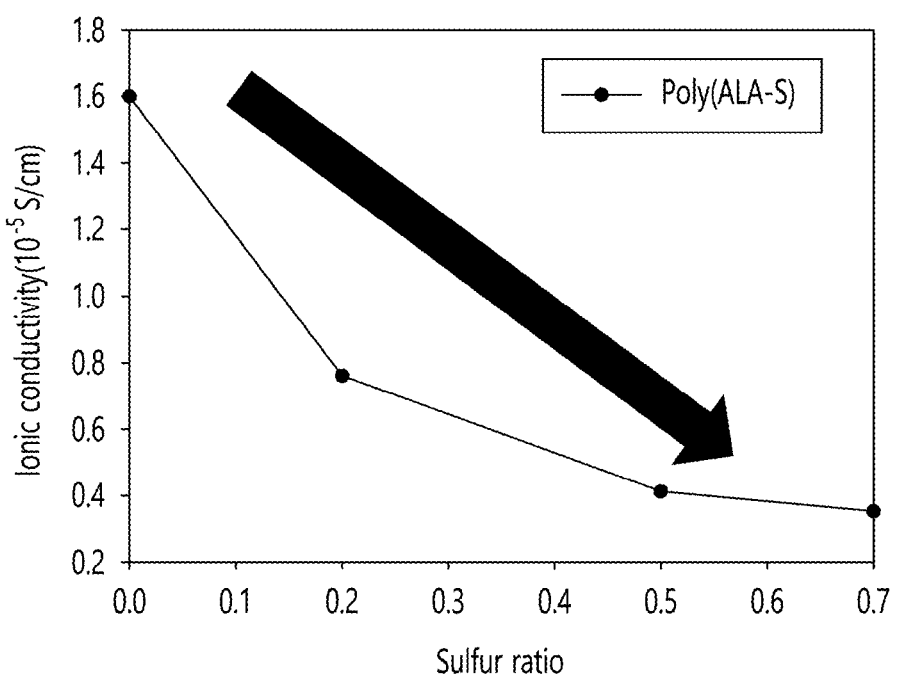
FIGS. 4a to 4c are the results of testing the charge/discharge performance of lithium symmetric cells by changing the concentration of the electrolyte additive (FIG. 4a), changing the separator coating material (FIG. 4b), and changing the type of electrolyte additive (FIG. 4c), in Experimental Example 3 described later.

Charging at a current density of 3.0 mA/cm$^2$ at 25° C. for 1 hour and discharging at a current density of 3.0 mA/cm$^2$ at 25° C. for 1 hour was set as one-time charge/discharge cycle, and the results of charging and discharging each of the lithium symmetric cells are shown in FIG. 4a.

According to FIG. 4a, it can be seen that the concentration of LiNO$_3$ is proportional to the lifetime of the lithium symmetric cell. From this, it may be seen that a synergistic effect exists between LiNO$_3$ and poly(ALA:S$_8$)_3:7_ppx2 (Sample 4).

2) In order to more clearly confirm this synergistic effect, 0.7 M of LiNO$_3$ was added to the composition of LiTFSI in DOL:DME=1:1 (v:v), and the electrolyte was controlled, and different types of separators were applied.

Figure 4B:
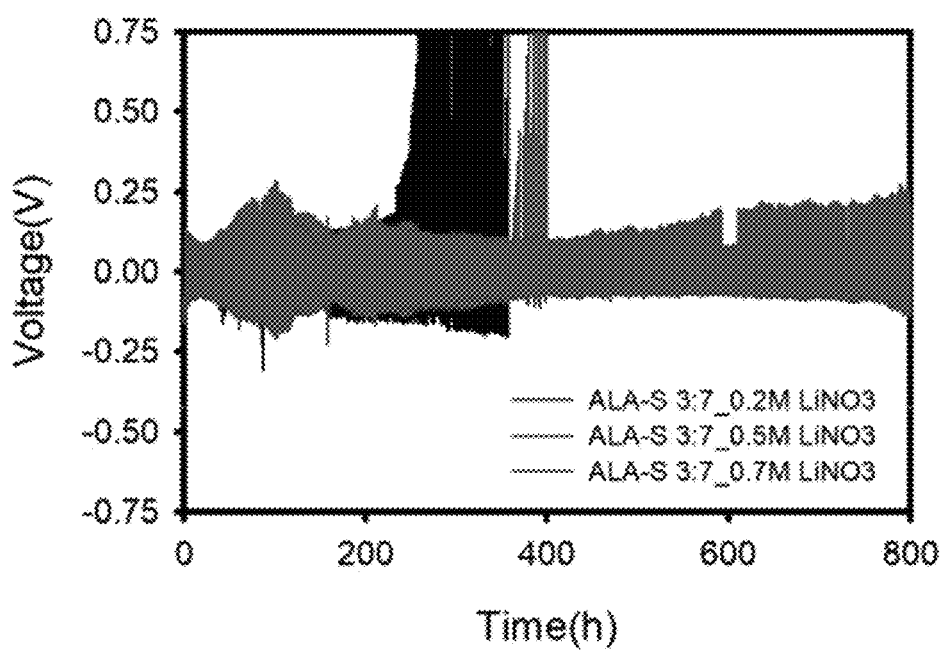

Specifically, a lithium symmetric cell to which Comparative Example 3 (Bare ppx2) and Example 3 (poly(ALA:S$_8$)_3:7_ppx2) were applied respectively as a separator was subjected to charge and discharge, and the results are shown in FIG. 4b. Here, the charge/discharge conditions of each lithium symmetrical cell are the same as the charge/discharge conditions previously performed.

On the other hand, Li$_2$S$_8$ is also a type of electrolyte additive, and is known to form a sulfide-based film on the surface of a lithium metal negative electrode in a battery. In this regard, 0.2 M of Li$_2$S$_8$ was added to the composition of 1M LiTFSI in DOL:DME=1:1 (v:v), which was used as an electrolyte, and Bare ppx2 was used to prepare a lithium symmetric cell (Comparative Example 3). The lithium symmetric cell to which Li$_2$S$_8$ of Comparative Example 3 was added was subjected to charge and discharge under the same conditions, and the results are shown in FIG. 4c.

Figure 4C:
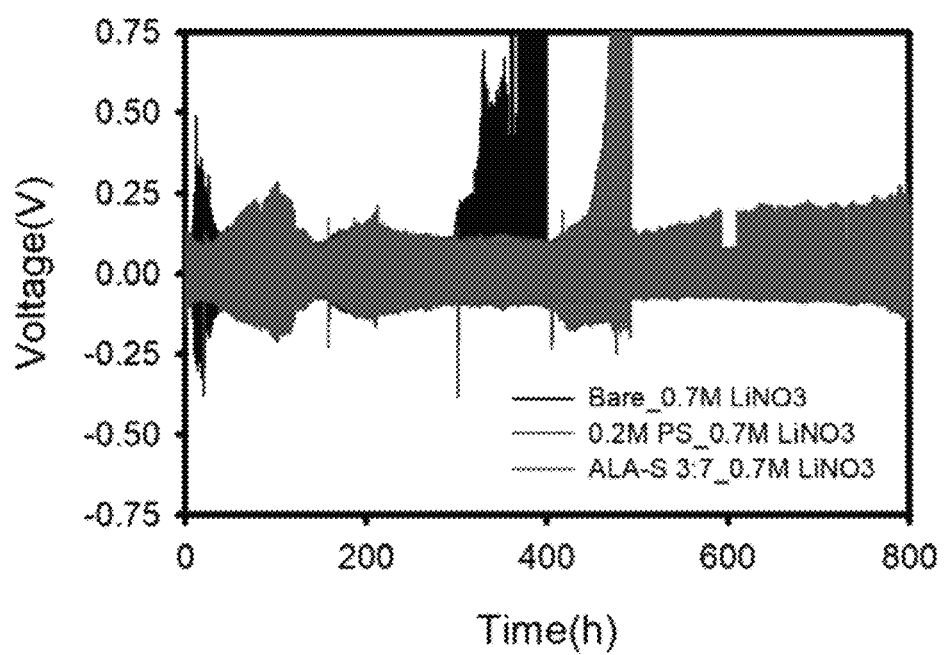

According to FIG. 4c, in the case of a lithium symmetric cell in which no electrolyte additive was introduced without coating the separator, a cell life of about 200 cycles (Comparative Example 2) was confirmed, and when Li$_2$S$_8$ was added to the electrolyte without coating the separator, a cell life of about 250 cycles (Comparative Example 3) was confirmed. On the other hand, when the separator was coated with poly(ALA-S) and LiNO$_3$ was added to the electrolyte (Example 3), the longest cell life of 400 cycles or more was confirmed.

Figure 4D:
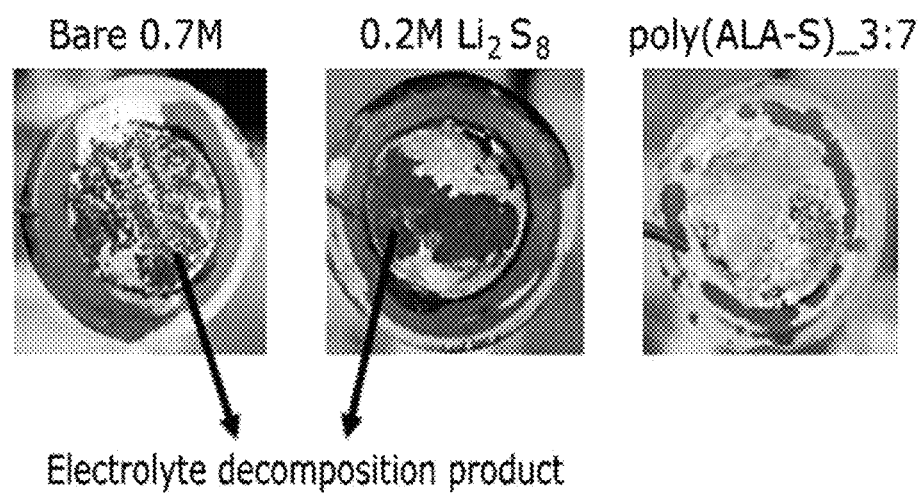
FIG. 4d shows the results of photographing the surface of each lithium metal negative electrode with a digital camera.

In order to find the cause of the difference in cell lifetime, each of the lithium symmetric cells was driven for 10 cycles and then decomposed to recover the lithium metal negative electrode, and the surface of each lithium metal negative electrode was photographed with a digital camera (FIG. 4d).

In FIG. 4d, not only in the case of the lithium symmetric cell (Comparative Example 2) in which the electrolyte additive was not introduced without coating the separator, but also in the case where Li$_2$S$_8$ was added to the electrolyte without coating the separator (Comparative Example 3), black electrolyte decomposition products were observed from the surface of the lithium metal negative electrode.

On the other hand, when the separator was coated with poly(ALA-S) and LiNO$_3$ was added to the electrolyte (Example 3), almost no electrolyte decomposition products were observed from the surface of the lithium metal negative electrode, and a silver-white lithium surface was observed.

In particular, a comparison was made between the case where Li$_2$S$_8$ was added to the electrolyte without coating the separator (Comparative Example 3) and the case where the separator was coated with poly(ALA-S) and LiNO$_3$ was added to the electrolyte (Example 3).

The lithium symmetric cell in each case was driven for 10 cycles as described above, and then decomposed to recover the lithium metal negative electrode. The surface of each lithium metal negative electrode was analyzed by X-ray photoelectron spectroscopy (Thermo VG Scientific), and the results are shown in FIGS. 4e and 4f.

According to FIG. 4e, when Li$_2$S$_8$ was added to the electrolyte without coating the separator (Comparative Example 3), peaks such as CF$_3$, CO$_3^-$, and O=C=O, which are generally known as electrolyte decomposition products, were confirmed.

Figure 4F:
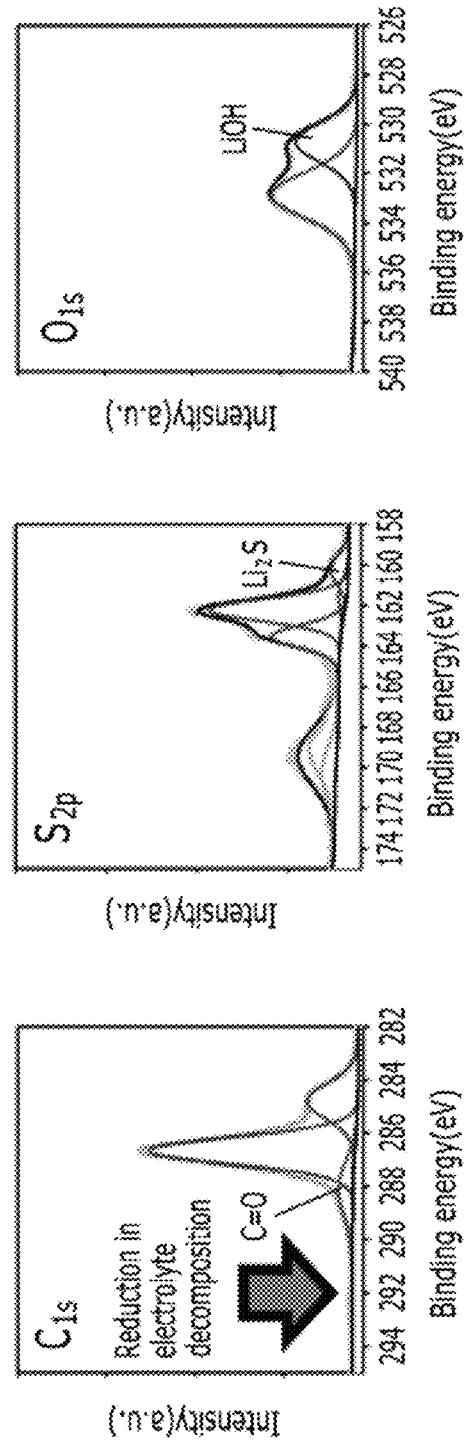

On the other hand, in FIG. 4f, when the separator was coated with poly(ALA-S) and LiNO$_3$ was added to the electrolyte (Example 3), peaks such as C=O and C—O—C due to the decomposition reaction of the carboxyl group contained in ALA were confirmed, but no peak due to the other electrolyte decomposition products was confirmed. In addition, a sulfate-related peak exhibited by the decomposition reaction of LITFSI, a lithium salt in the electrolyte, was also relatively reduced.

From this result, it can be seen that when the separator was coated with poly(ALA-S) and LiNO$_3$ was added to the electrolyte, poly(ALA-S) was dissolved in the electrolyte, and then concentrated on the surface of the lithium metal negative electrode to form a protective layer, and depolymerization of poly(ALA-S) was performed preferentially over the decomposition of the electrolyte between the protective layer and the lithium metal negative electrode, thereby minimizing electrolyte decomposition and increasing cell life.

Experimental Example 4

In the Experimental Example 4, a battery made of a lithium half cell (Li/SUS) including the separator of Example 3 (poly(ALA:S$_8$)_3:7_ppx2), and a battery made of lithium half-cell (Li/SUS) including the separator of Comparative Example 1 (poly(ALA)_ppx2) were compared. Here, as the electrolyte composition of each battery, those in which 1M LiTFSI was dissolved in DOL/DME (1:1 v/v), and 0.7M LiNO$_3$ was added was used.

Specifically, charging at a current density of 2.0 mA/cm$^2$ at 25° C. for 1 hour and discharging at a current density of 2.0 mA/cm$^2$ at 25° C. for 1 hour was set as one-time charge/discharge cycle, and each of the Li/SUS cells was charged and discharged for 10 cycles. Thereafter, each Li/SUS cell was decomposed, and the SEI remaining on the surface of the SUS electrode was analyzed by XPS. Each analysis result is shown in FIG. 5a (Example 3) and FIG. 5b (Comparative Example 1).

Figure 5A:
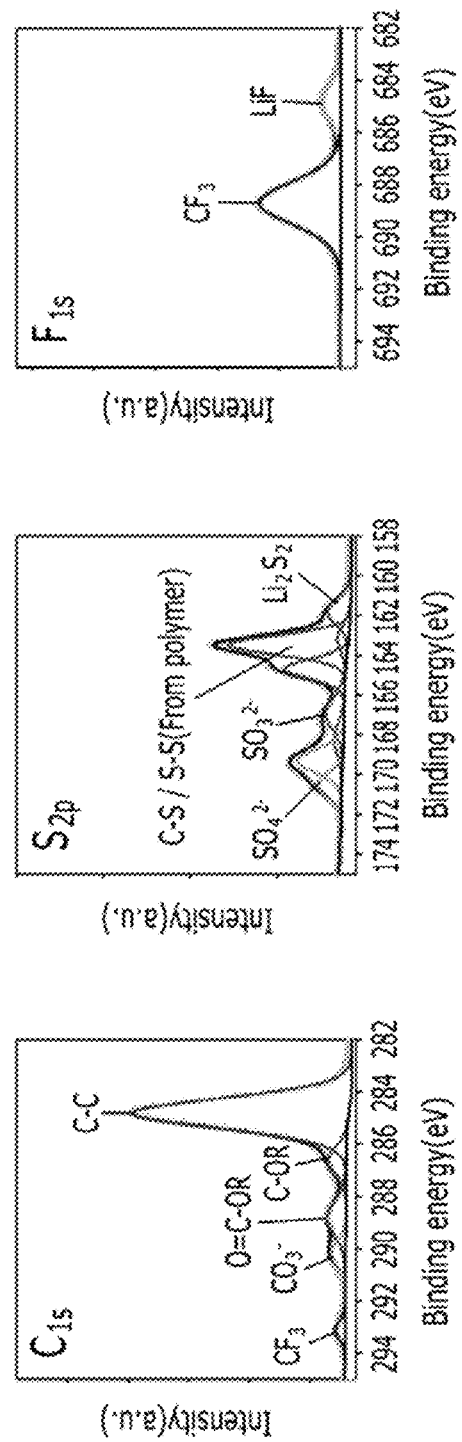
FIGS. 5a and 5b show the results of testing the charge/discharge performance of a lithium half-cell by changing the separator coating material in Experimental Example 4 described later.
Figure 5B:
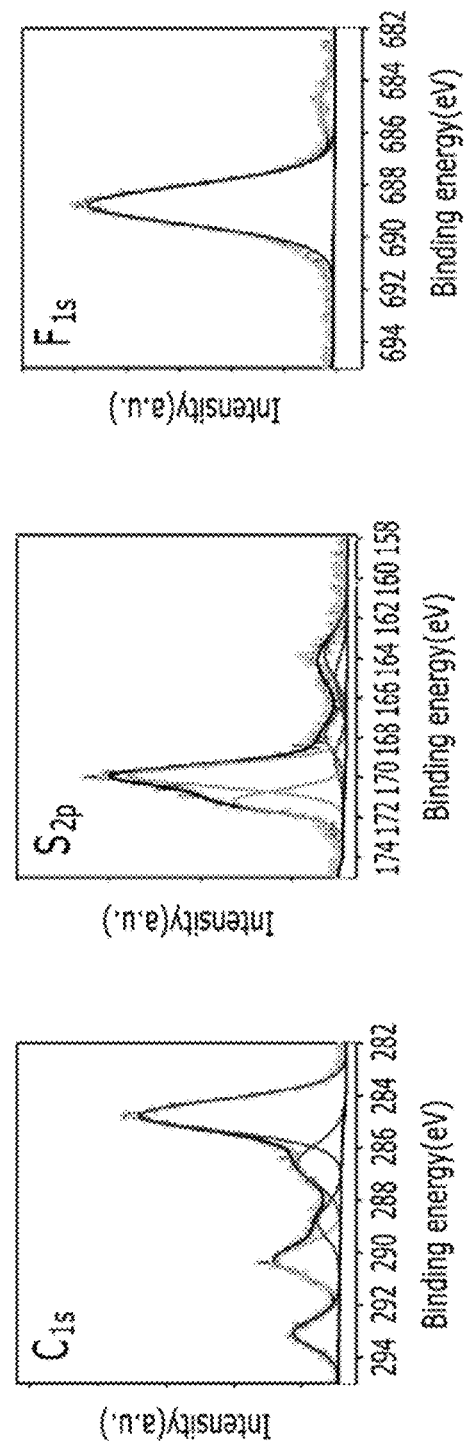

Looking at both FIG. 5a (Example 3) and 5b (Comparative Example 1), the separator of Example 3 (poly(ALA:S$_8$)_3:7_ppx2) appeared relatively few peaks due to electrolyte decomposition such as CF$_3$, CO$_3^-$, O=C—OR, C—OR, and SO$_4^{2-}$, as compared with the case of applying the separator of Comparative Example 1 (poly(ALA)_ppx2), and this result is in line with Experimental Example 3.

This can be inferred from the result that stable inorganic sulfide such as Li$_2$S$_2$, which is not applied to the separator of Comparative Example 1 (poly(ALA)_ppx2), is contained in the SEI in a high ratio.

Meanwhile, the impedance of each of the lithium half cells (Li/SUS) was analyzed under the same conditions as in Experimental Example 2.

Figure 5C:
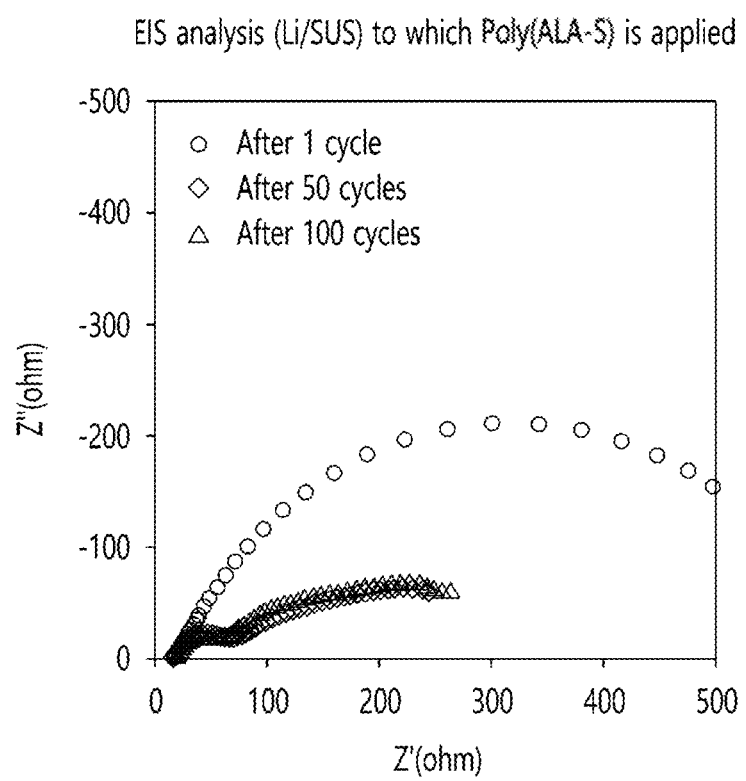
FIG. 5c shows the EIS (electrochemical impedance spectroscopy) analysis (Li/SUS) to which Poly(ALA-S) is applied in Example 3.
Figure 5D:
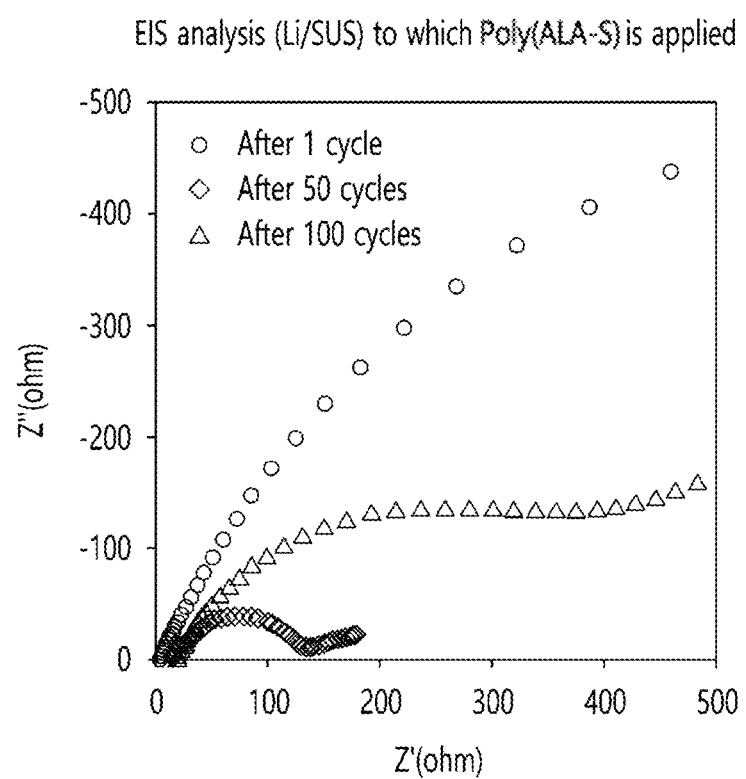
FIG. 5d shows the EIS analysis for Comparative Example 1.

As a result, in both a battery made of a lithium half cell (Li/SUS) including the separator (poly(ALA:S8)_3:7_ppx2) of Example 3 (FIG. 5c), and a battery made of a lithium half cell (Li/SUS) including the separator (poly(ALA)_ppx2) of Comparative Example 1 (FIG. 5d), it is confirmed that the $R_{film}$ & $R_{et}$ values are very large in the first cycle in which the polymers coated on one surface of the separator have not reacted, but the values gradually decreases as the subsequent cycle progresses.

Based on EIS (electrochemical impedance spectroscopy) data after 50 cycles that the reaction was judged to have completely progressed, when looking at the size of the semicircle representing RSEI, it can be seen that the lithium half cell (Li/SUS) to which the separator (poly(ALA)_ppx2) of Comparative Example 1 is applied is 126Ω, the lithium half cell (Li/SUS) to which the separator (poly(ALA:S$_8$)_3:7_ppx2) of Example 3 was applied is 60Ω, and in the latter case, an SEI layer with much higher ionic conductivity is formed on the surface of the negative electrode.

In particular, after 100 cycles, when the separator of Comparative Example 1 (poly(ALA)_ppx2) was applied, unstable SEI was formed on the surface of the negative electrode, which appears to cause a side reaction with the electrolyte to form dead Li, thereby significantly increasing the resistance by $R_{film}+R_{charge\ transfer}$. On the other hand, when the separator of Example 3 (poly(ALA:S$_8$)_3:7_ppx2) was applied, it is confirmed that SEI with excellent durability is formed, the stable interface is well maintained, and RSEI is kept constant at 58Ω without an increase in $R_{charge\ transfer}$. These results are inferred to be due to the high proportion of inorganic sulfide-based SEI (Li$_2$S, Li$_2$S$_2$) and low electrolyte decomposition products detected in the XPS analysis.

Experimental Example 5

In Experimental Example 5, the difference depending on whether or not LiNO$_3$ was added as an electrolyte was examined. To this end, a Li/SUS cell in which poly(ALA:S$_8$)_3:7_ppx2 was used as a separator and a 0.7 M concentration of LiNO$_3$ was added to the electrolyte (Example 3), Li/SUS cell in which poly(ALA)_ppx2 was used as a separator and LiNO$_3$ was added to the electrolyte (Comparative Example 1), and a Li/SUS cell (Comparative Example 4) in which poly(ALA:S$_8$)_3:7_ppx2 was used as a separator, but LiNO$_3$ was not added to the electrolyte, were respectively driven under the same conditions as in Experimental Example 4, and the results are shown in FIG. 6.

Figure 6:
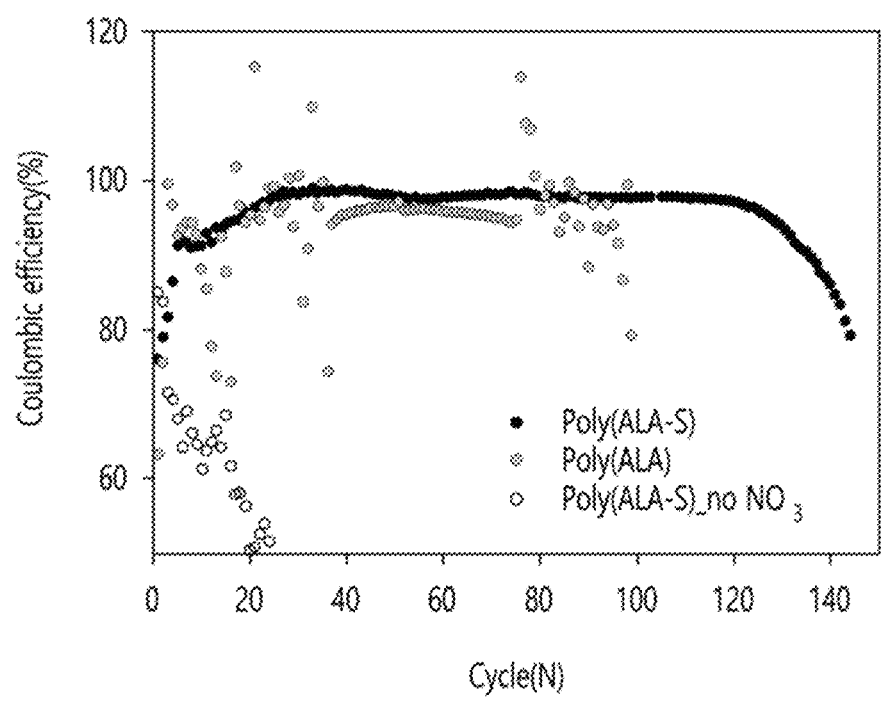
FIG. 6 show the results of testing the charge/discharge performance of lithium half cells by changing the separator coating material, and changing whether or not the electrolyte additive is applied, in Experimental Example 5 described later.

In FIG. 6, when defined as the lifetime of a cell until the coulombic efficiency drops below 80%, the lifetime of a Li/SUS cell (Example 3) in which poly(ALA:S$_8$)_3:7_ppx2 was used as a separator and LiNO$_3$ with a concentration of 0.7 M was added to the electrolyte was confirmed to be about 140 cycles. This appears to be due to the result that not only an inorganic sulfide-based compound is produced as a polymer reduction decomposition product of poly(ALA:S8)_ 3:7_ppx2, but also an inorganic nitride compound, an inorganic nitrate compound, or a mixture thereof is produced as the reductive decomposition product of LiNO$_3$.

On the other hand, it was confirmed that the Li/SUS cell (Comparative Example 1) in which poly(ALA)_ppx2 was used as a separator and LiNO$_3$ was added to the electrolyte has reached the end of its life after being driven unstable up to 100 cycles. On the other hand, it is confirmed that the Li/SUS cell (Comparative Example 4) in which poly(ALA:S$_8$)_3:7_ppx2 is used as a separator but LiNO$_3$ is not added to the electrolyte is immobilized by SEI containing only inorganic sulfide as an inorganic compound, and reaches the end of its life after only 20 cycles.

The invention claimed is:

1. A lithium metal negative electrode comprising:
   a negative electrode; and
   a protective layer present on the negative electrode,
   wherein the protective layer comprises:
   a polymer of alpha lipoic acid (ALA) and an octagonal-ring shaped sulfur molecule (S$_8$),
   a depolymerized product of the polymer,
   an inorganic sulfide-based compound, and
   at least one of an inorganic nitride-based compound or an inorganic nitrate-based compound.

2. The lithium metal negative electrode according to claim 1, wherein
   the inorganic sulfide-based compound comprises at least one of Li$_2$S or Li$_2$S$_2$.

3. The lithium metal negative electrode according to claim 1, wherein
   the inorganic nitride-based compound comprises Li$_3$N, and
   the inorganic nitrate-based compound comprises LiN$_x$O$_y$, wherein x=1 or 2, and y=2 or 3.

4. The lithium metal negative electrode according to claim 1, wherein
   the polymer is obtained by polymerizing alpha lipoic acid and octagonal-ring shaped sulfur molecules in a weight ratio of 10:1 to 1:10.

5. The lithium metal negative electrode according to claim 1, wherein
   the polymer of alpha lipoic acid (ALA) and octagonal-ring shaped sulfur molecule (S$_8$) is represented by the following Chemical Formula 1:

[Chemical Formula 1]

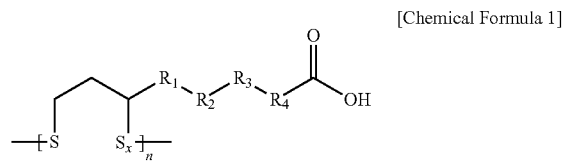

in the Chemical Formula 1, R$_1$ to R$_4$ are each independently a substituted or unsubstituted C1 to C3 alkylene group;

3≤n≤10; and 1<x≤10.

6. The lithium metal negative electrode according to claim 1, wherein
   the depolymerized product of the polymer is an oligomer represented by at least one of the following Chemical Formula 1-1 or a monomer represented by the following Chemical Formula 1-2:

[Chemical Formula 1-1]

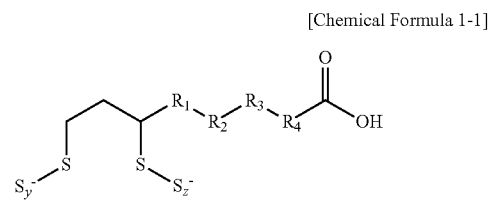

in the Chemical Formula 1-1, $R_1$ to $R_4$ are each independently a substituted or unsubstituted C1 to C3 alkylene group;
$1 \leq y \leq 6$; and
$1 \leq z \leq 5$,

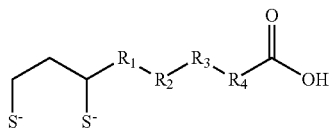

[Chemical Formula 1-2]

in the Chemical Formula 1-2, $R_1$ to $R_4$ are each independently a substituted or unsubstituted C1 to C3 alkylene group.

7. The lithium metal negative electrode according to claim 6, wherein
the oligomer and the monomer each independently further comprise a lithium cation.

8. The lithium metal negative electrode according to claim 1, wherein
the negative electrode is a lithium free anode consisting of only a copper current collector; or
the negative electrode comprises:
a copper current collector and a lithium metal layer present on the copper current collector.

9. A lithium metal battery comprising:
the lithium metal negative electrode of claim 1;
a positive electrode;
a separator located between the lithium metal negative electrode and the positive electrode; and
an electrolyte impregnated in the separator, wherein the electrolyte comprises a lithium salt, an organic solvent, and $LiNO_3$.

10. The lithium metal battery according to claim 9, further comprising
a coating layer comprising the polymer is present on at least one surface facing the negative electrode among both surfaces of the separator facing the negative electrode.

11. The lithium metal battery according to claim 9, wherein a concentration of the $LiNO_3$ in the electrolyte is 0.1 M to 1.0 M.

12. The lithium metal battery according to claim 9, wherein
the lithium salt comprises lithium bis(trifluoromethanesulfonyl)imide (LiTFSI).

13. The lithium metal battery according to claim 9, wherein
the organic solvent is a mixture of 1,3-dioxolane (DOL) and dimethoxyethane (DME) in a volume ratio of 3:7 to 7:3.

14. A method for producing a lithium metal battery comprising the steps of:
preparing a polymer of alpha lipoic acid (ALA) and an octagonal-ring shaped sulfur molecule ($S_8$);
coating the polymer onto one surface of a separator;
preparing an electrode assembly wherein the separator surface coated with the polymer is positioned opposite to a lithium metal negative electrode, and another surface of the separator is positioned opposite to a positive electrode,
injecting an electrolyte into the separator in the electrode assembly; and
packaging the electrode assembly after injecting the electrolyte to obtain the lithium metal battery.

15. The method for producing a lithium metal battery according to claim 14, wherein
in the obtained lithium metal battery,
a part of the polymer coated on the surface of the separator is depolymerized by reacting the polymer with the lithium metal of the negative electrode,
another part of the polymer coated on the surface of the separator is reduced and decomposed by reacting with the electrolyte, and
wherein the electrolyte comprises $LiNO_3$ and the $LiNO_3$ is reduced and decomposed by reacting with the lithium metal of the negative electrode.

16. The method for producing a lithium metal battery according to claim 14, wherein
heat is applied at a temperature in a range of 150° C. to 175° C. to a mixture of the alpha lipoic acid (ALA) and the octagonal-ring shaped sulfur molecule ($S_8$) in the step of preparing a polymer.

* * * * *